United States Patent Office 3,564,413
Patented Feb. 16, 1971

3,564,413
AREA QUANTIZATION DELTA MODULATION SYSTEM
Kosaku Uchida, Neyagawa-shi, Japan, assignor to Matsushita Electric Industrial Co., Ltd., Osaka, Japan
Filed Mar. 20, 1967, Ser. No. 624,476
Claims priority, application Japan, Mar. 29, 1966, 41/19,778, 41/19,779, 41/19,780; Aug. 26, 1966, 41/56,598; 41/56,599
Int. Cl. H03k 13/22
U.S. Cl. 325—38                  5 Claims

ABSTRACT OF THE DISCLOSURE

There is disclosed a modulation system based on a fundamental idea that the system produces a positive or negative output pulse when an area defined by the time axis and the increment of input signal voltage after occurrence of the preceding output pulse from the system reaches a predetermined positive or negative amount. This system is constituted to feature less number of output pulses, high immunity against interfering pulses and longer pulse intervals, so that it can be used for the primary modulation in an asynchronous multiplex system like RADA.

---

Figure 1:
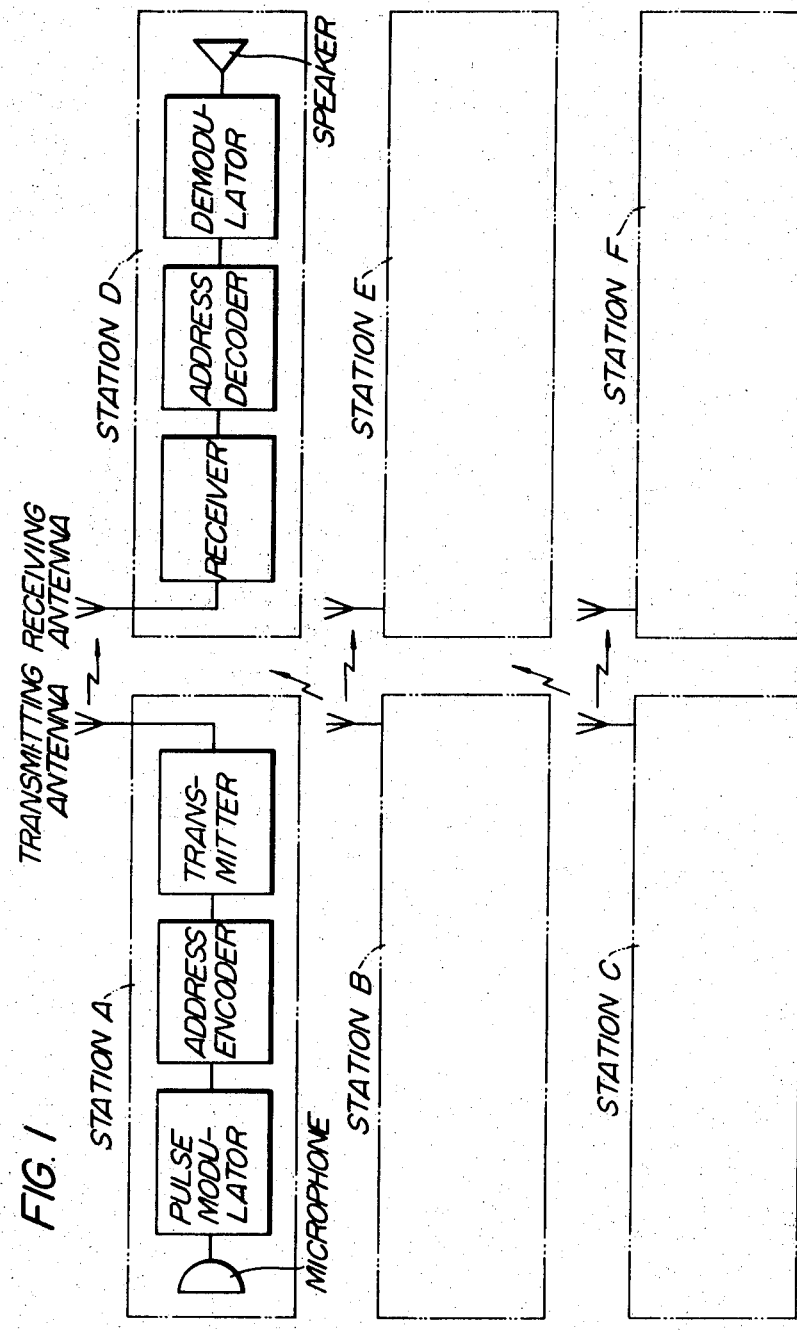

This invention relates generally to a modulation system for asynchronous multiplex communication, and particularly to a novel modulation system which is adapted to produce either positive or negative output pulse when the area defined by the time axis and the increment of the input signal voltage after occurrence of the preceding output pulse reaches a positive or negative threshold level, thus lessening the number of the output pulses and improving the articulation.

The asynchronous multiplex system are now under examination in many parts of the world, in order to exploit more effective usage of the radio frequency band. The success depends greatly on development of an excellent modulation system to convert the audio signals into pulses.

In the modulation system for asynchronous multiplex communication system, it is desirable, as will be described hereinafter, that less number of output pulses is delivered. As for the requirement to lessen the output pulses, it may be met with the zero-cross modulation method as well known in the art. The zero-cross modulation with which a pulse is generated whenever the audio signal crosses the zero level, produces no pulse during the pauses between the audio signals and lets out very scarce number of output pulses even when the audio signals exist. The zero-cross modulation, however, does not give very natural and understandable speech when demodulated, as it does not pick up fully the amplitude informations of the audio signals. Another disadvantage of zero-cross modulation is that it impairs badly the speech quality with the noise at the modulator input and the noise pulses at the demodulator input.

A modulation system which may reproduce a speech of more improved naturalness, though having more pulses than the zero-cross system, will be so-called asynchronous delta modulation system. According to this modulation system, a positive or negative output pulse is generated whenever the variation in the input signal voltage reaches a predetermined positive or negative value respectively. The disadvantage of this system is that it delivers still too many pulses. Namely, the audio signals contain portions which contribute greatly to the articulation though which are small in the amplitude. In order to pick up these portions, it is required to lower the quantizing unit level (the above-mentioned "predetermined value" of the variation in the input signal voltage). If, however, that level is lowered, more pulses are produced in the portions where the amplitude of the audio signal is large, resulting in the increase of overall pulse number.

Object of this invention, therefore, is to provide a unique modulation system, that is, the area delta modulation, which is superior in the naturalness of speech to the zero-cross modulation, produces less number of pulses than the above-mentioned asynchronous delta modulation and is excellent in the articulation.

Figure 2:
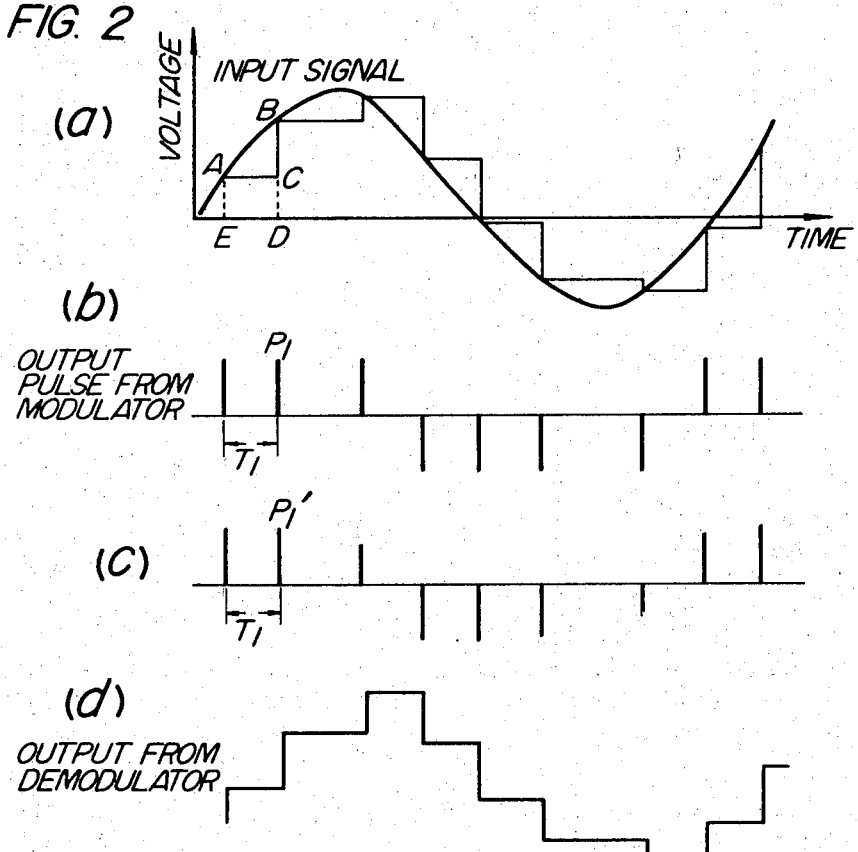
Figure 3A:
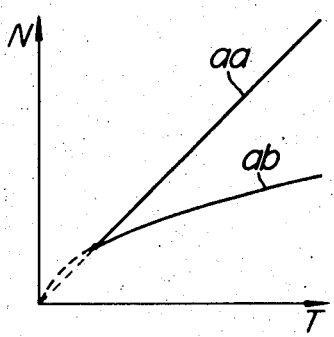
Figure 3B:
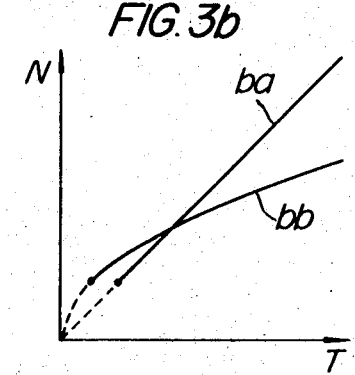
Figure 4:
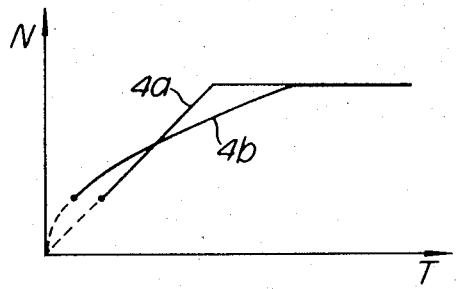
Figure 5:
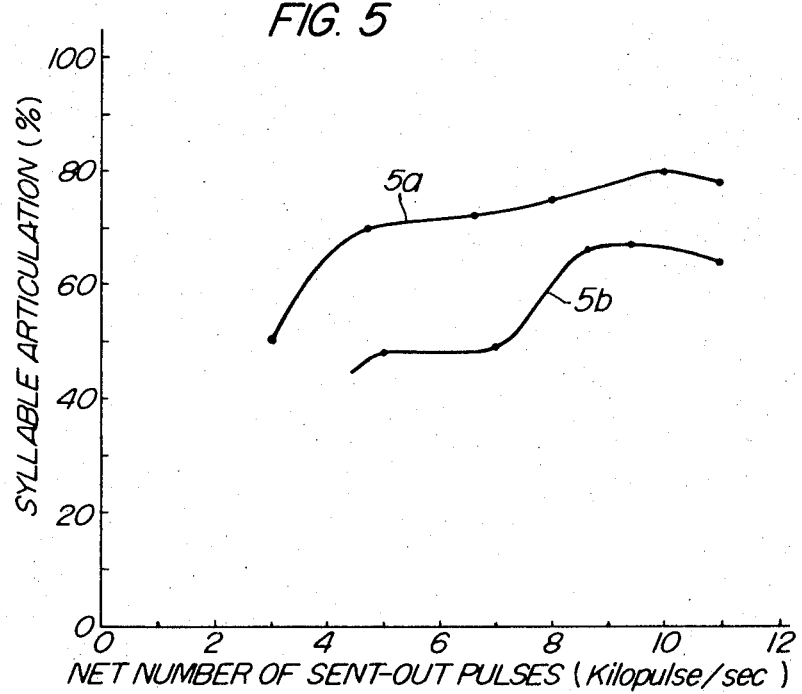
Figure 6:
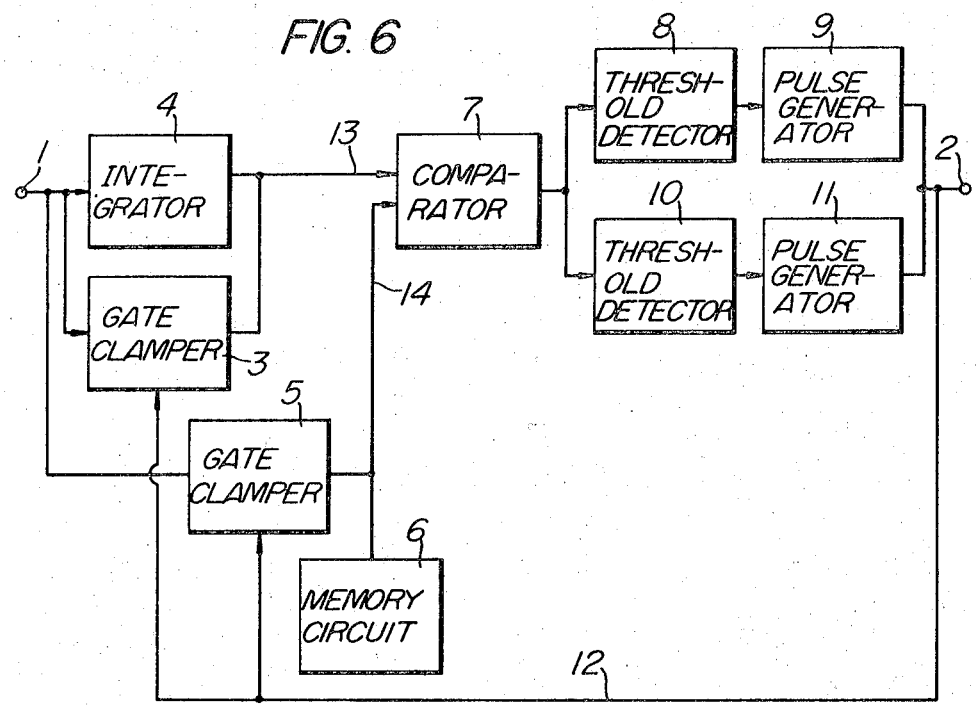
Figure 7:
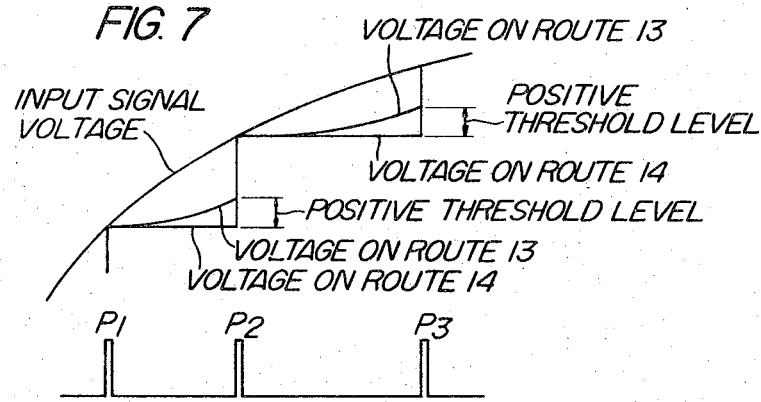
Figure 8:
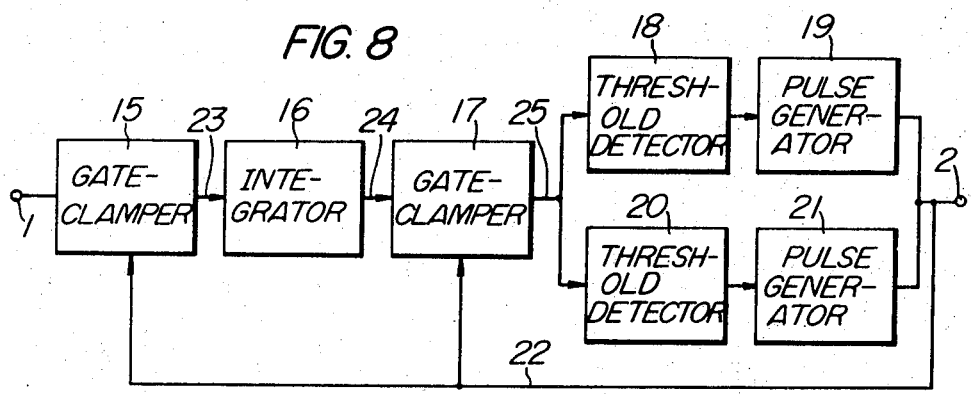
Figure 9:
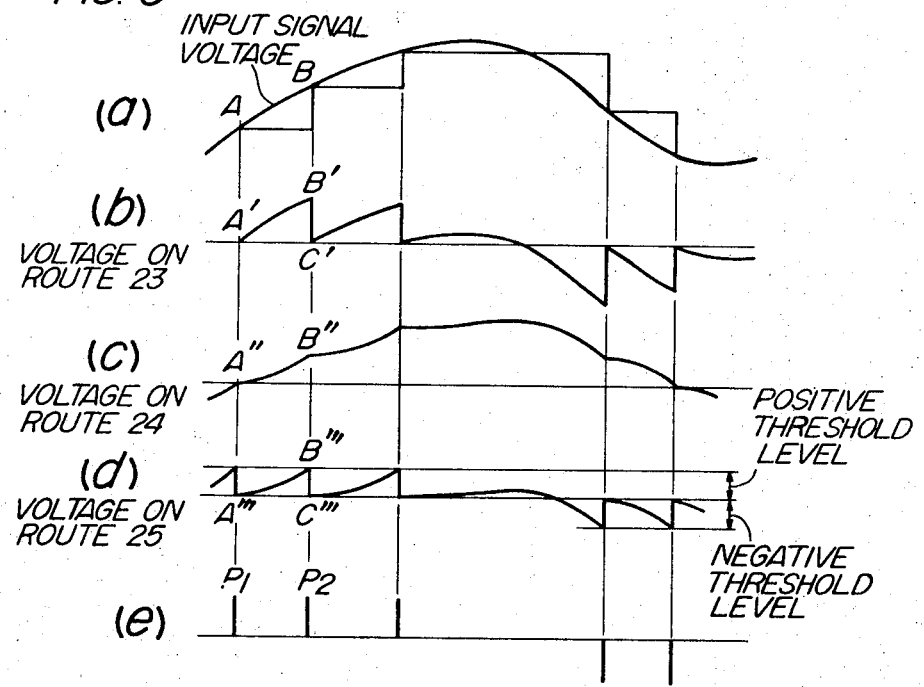
Figure 10:
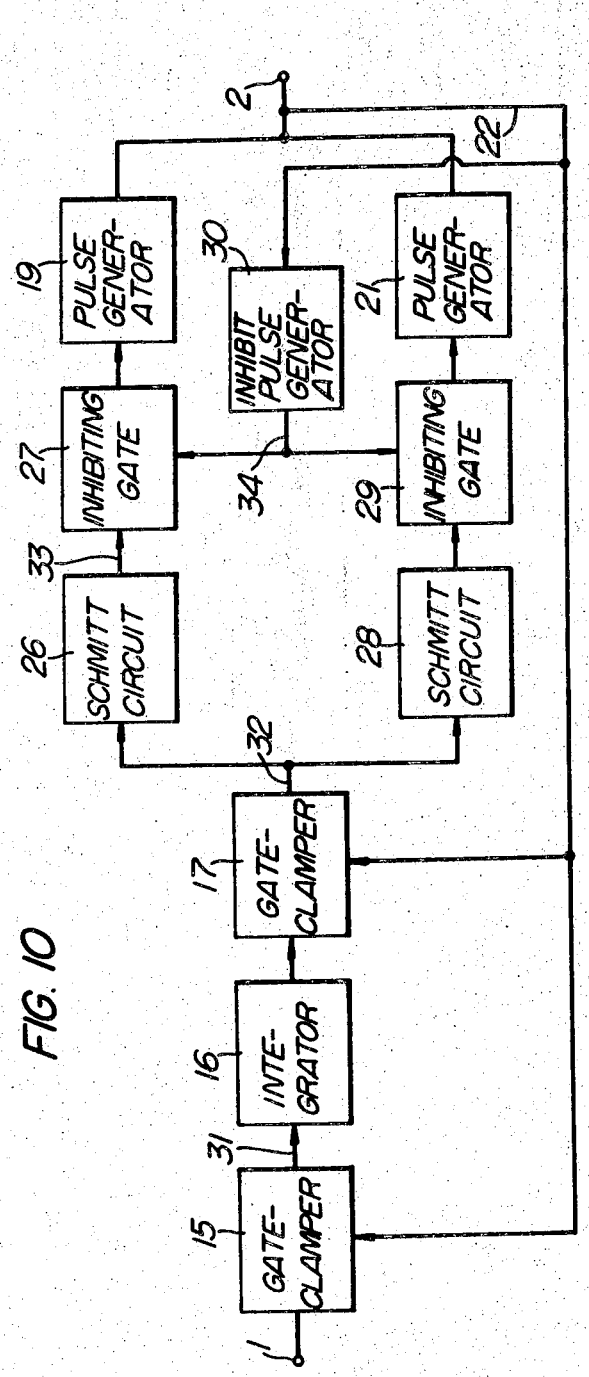
Figure 11:
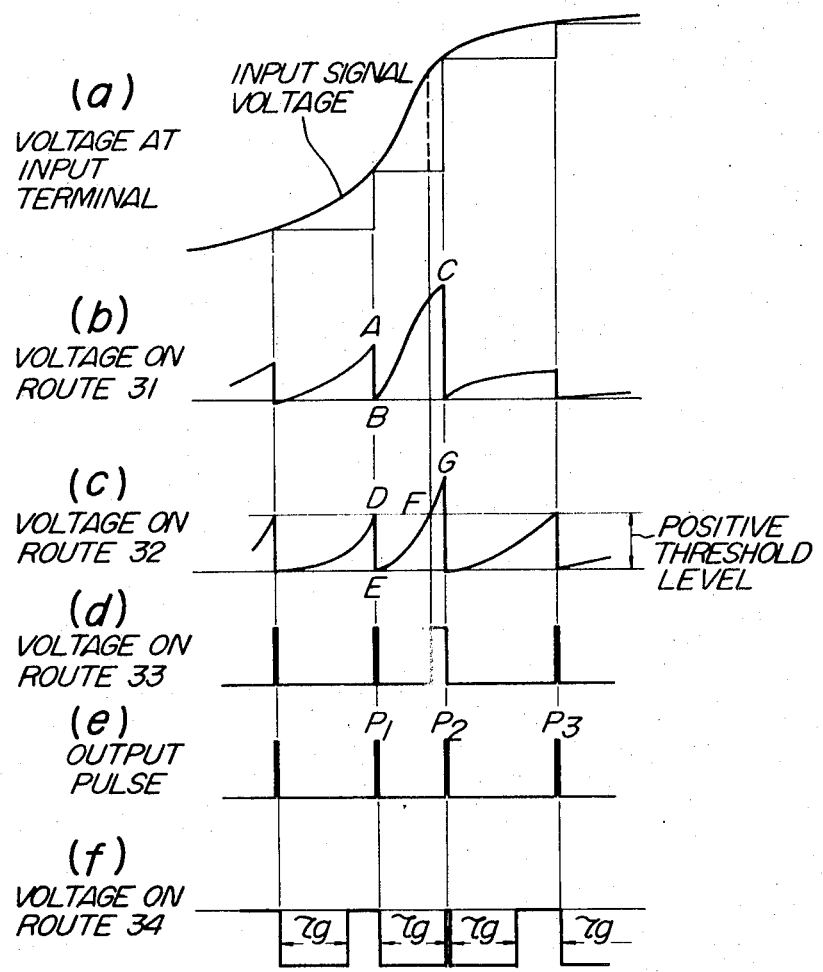
Figure 12:
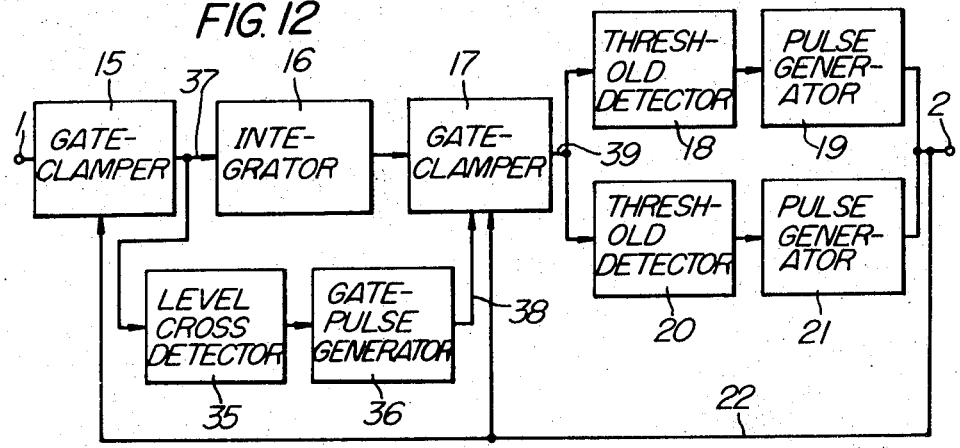
Figure 13:
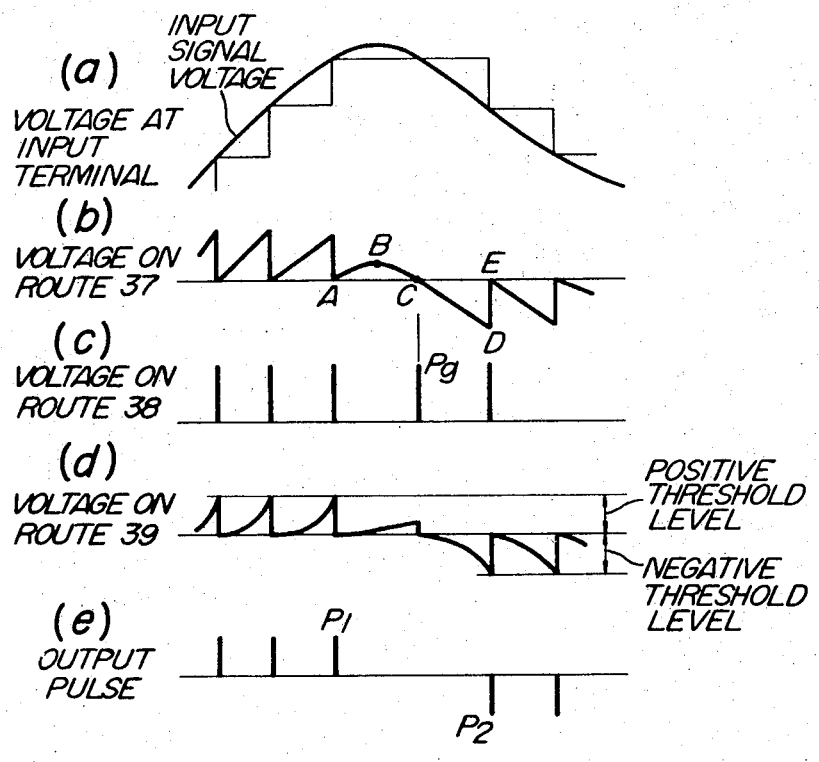
Figure 14:
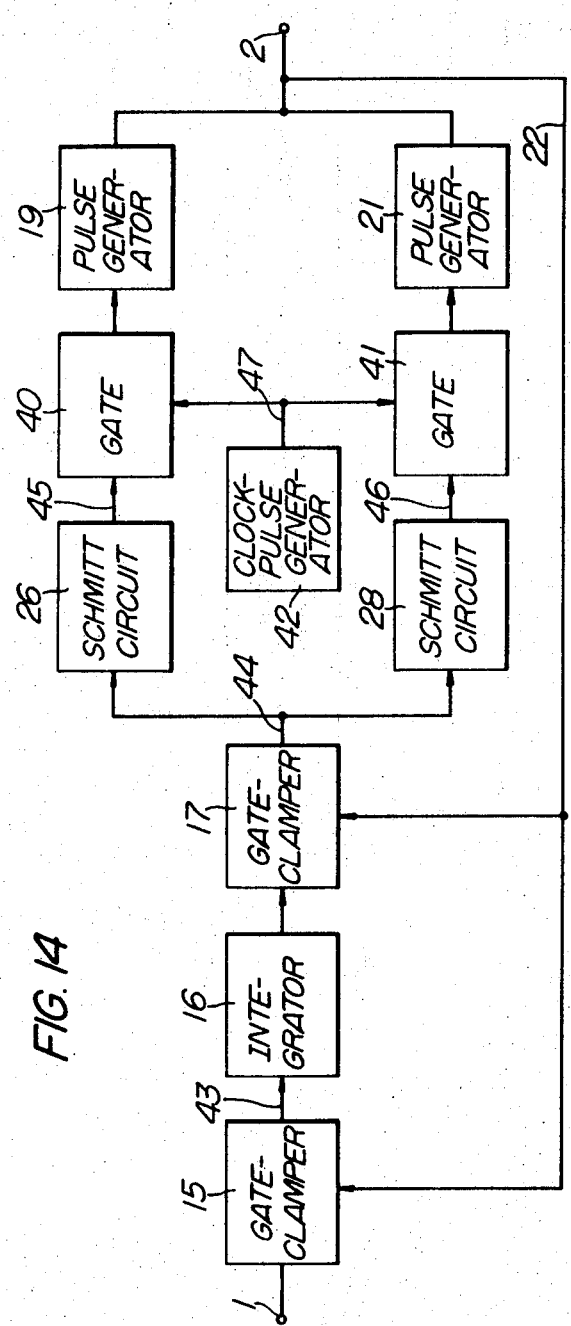
Figure 15:
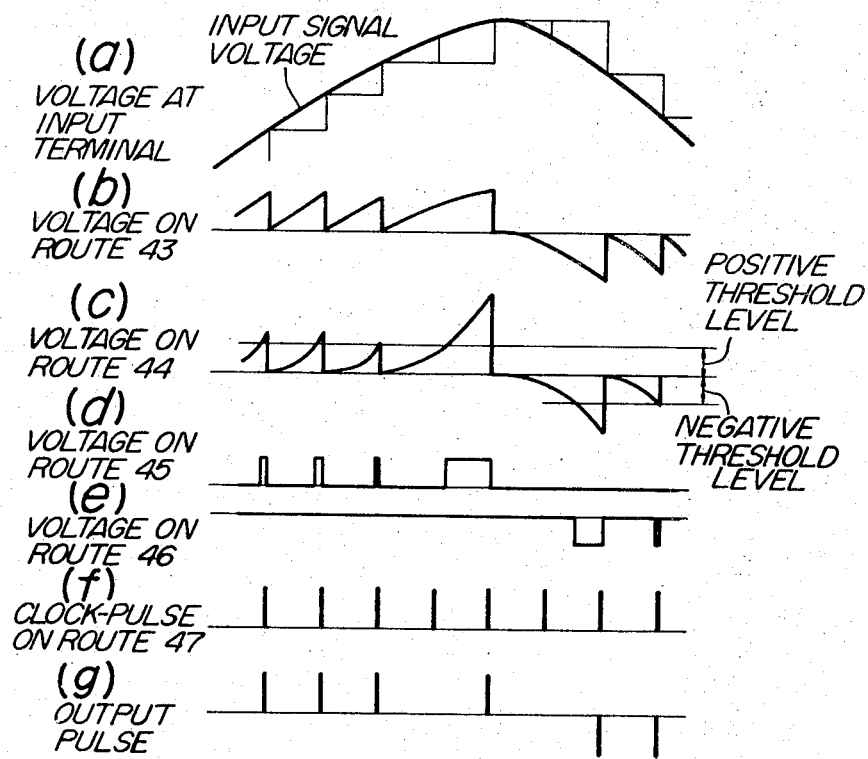
Figure 16:
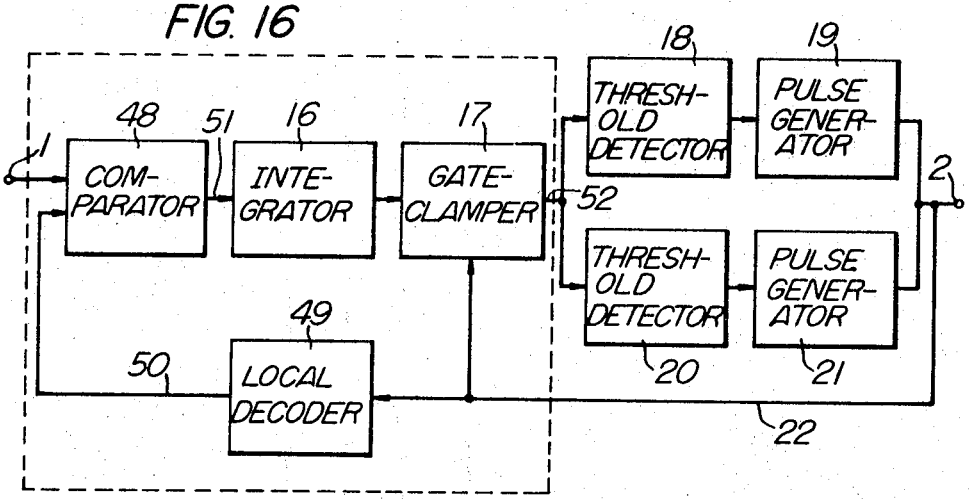
Figure 17:
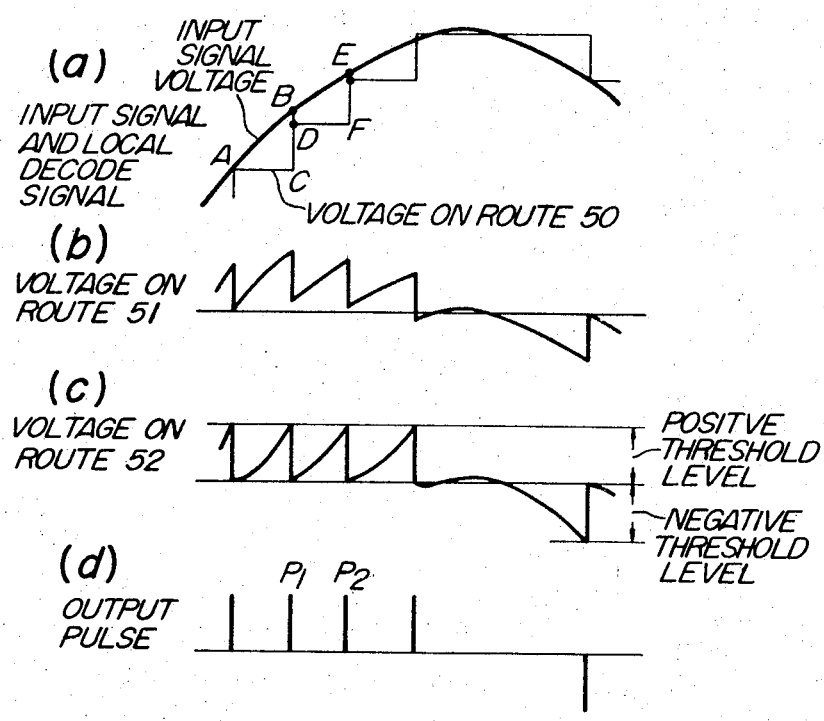

This invention will be more clearly understood by the following explanation given with reference to the accompanying drawings, in which:

FIG. 1 is a schematic diagram of the conventional asynchronous multiplex communication system;
FIG. 2 shows diagrams illustrating the operation principles of this invention;
FIGS. 3a, 3b and 4 show the characteristics of the area delta modulation system according to this invention compared with the corresponding characteristics of the conventional asynchronous delta modulation system;
FIG. 5 shows test results on articulation of the area delta modulation according to this invention compared with that of the conventional asynchronous delta modulation;
FIG. 6 is a block diagram showing the constitution of an embodiment of this invention;
FIG. 7 is a diagram for explanation of the operation of the embodiment of FIG. 6;
FIG. 8 is a block diagram showing another embodiment of this invention;
FIG. 9 is a diagram for explanation of the operation of the system shown in FIG. 8;
FIG. 10 is a block diagram showing still another embodiment of this invention;
FIG. 11 is a diagram for explanation of the operation of the system shown in FIG. 10;
FIGS. 12, 14 and 16 are block diagrams of other embodiments of this invention; and
FIGS. 13, 15 and 17 are diagrams for explanation of the operation of the systems shown in FIGS. 12, 14 and 16 respectively.

In recent years, an asynchronous multiplex communication system utilizing the pulses bearing the address code, for instance, so-called RADA system, became to attract attentions of those in the art. It is a system as will be described hereinafter.

Referring to FIG. 1, it is assumed that the station A is now addressing to the station D. In the station A, the voice is converted to electric signal through the microphone and the signal is modulated by the pulse modulator. The address encoder prepares a prescribed number of address pulses each time one output pulse is sent out from the pulse modulator, endowing the pulses with particular address code of the opposite station D. The address code can be encoded by the combination of pulse intervals between the adjacent address pulses and/or the combination of carrier frequency which carries the address pulses. The address pulses which have been given the address code of the station D through the address encoder, are sent out to common space, through the transmitter and antenna, as a pulsive radio wave having a certain width of occupied frequency band. The address pulses from the station A are received by the receiving antenna and the receiver in the receiving station D and are decoded through the address decoder to be reproduced as the pulses similar to the output pulses from the modulator of the sending station. These pulses are demodulated through the demodulator to energize the speaker.

Besides the sation A, there are a number of transmitting stations including the stations B and C, which are sending out signals, in the same frequency band as the station A, for the particular opposite station respectively including E and F. As the address code of the station D is not sent out from the station B or C, crosstalk between the stations D and B or C will not occur. However, it does not mean that any number of couples of stations can communicate simultaneously. When many stations are calling at a time, a great number of pulses exists in the common space, thus increasing the probability that the address code of the station D is found by chance from a combination of pulses from the other stations even if any of the other stations are not sending the address code of the station D. This will result in an increased pulsive noise in the speaker output in the station D. It is desirable, of course, for higher utility factor of the frequency band if more stations can communicate simultaneously with a given frequency band and common space. As stated above, however, the number of pulses which can exist in the common space at a time, is limited from the standpoint of the pulsive noise in the receiving stations. Therefore, it is required to reduce the number of pulses sent out from each station, that is, to reduce the output pulses from the modulator in the transmitting station.

Besides, it is preferable, of course, for a modulation system to be more immune against noise pulses in the demodulator input.

Another requirement of the modulator output pulses is that the intervals between pulses must be sufficiently long. It is because; if a certain number of address codes should be maintained, the longer pulse interval, accordingly wider pulse width, allows the narrower occupied band for the transmission of the pulses.

It will be obvious from the above description that the requirements of the pulse modulation system for an asynchronous multiplex system which uses pulses, are as follows:

(1) High articulation with less output pulses from the modulator,
(2) High immunity of the articulation against noise pulses, and
(3) Longer intervals between the adjacent output pulses from the modulator.

This invention is intended to provide a new pulse modulation system having the above-mentioned features.

The area delta modulator in accordance with the present invention generates either positive or negative output pulses of a certain amplitude when the area defined by the time axis and the increment of the input signal after sending-out of the preceding output pulse reaches a certain positive or negative level respectively. If the above-mentioned area is defined in positive side to generate positive output pulse when the increment of input signal is positive-going, then the area is defined in negative side to generate negative output pulse when the increment is negative-going. Thus, the positive output pulse $P_1$ shown in FIG. 2(b) is sent out corresponding to the positive area (ABC), but not to the area (ABCDE). If the pulse $P_1$ is sent out corresponding to the area (ABCDE), then, it is the delta-sigma (Δ-Σ) modulation, well known in the prior art.

Preferable steps of demodulation are as follows: A sequence of pulses ($P_1'$ and etc. in FIG. 2(c)) of which the pulse height is inversely proportional to the preceding pulse interval ($T_1$ and etc. in FIG. 2(b)), is produced from the sequence of output pulses ($P_1$ and etc. in FIG. 2(b)) of the area delta modulator which have a fixed pulse height, and the pulses of the former sequence are integrated.

In fact, it is not easy to produce the second pulse sequence (FIG. 2(c)) in which the pulse height is inversely proportional to the preceding pulse interval. For actual purpose, it will not cause a significant distortion if the first pulse sequence (FIG. 2(b)), per se, is integrated, instead of the second pulse sequence. Though this practice may appear to be essentially illogical by the fact that an informatoin which was picked up in terms of area is transmitted as pulses of uniform height, which, in turn, are integrated in demodulation stage; no significant distortion will not occur actually, as the information is carried on the pulse intervals. In fact, a sinusoidal input to the modulator is demodulated as substantially sinusoidal output from the demodulator.

It was found that the area delta modulation system responds to a sinusoidal input as follows:

If K represents the number of output pulses sent out from the modulator during one cycle period of the input signal, V is the amplitude of input signal and $f$ is the frequency of input signal, then there will be the following relation between them:

$$K \alpha \sqrt{V}/\sqrt{f}$$

In order to make K unaffected by $f$, it is only required to provide, before the modulator, a pre-emphasis circuit having a characteristics represented by, $$V \alpha f V'$$

where V' is input amplitude of the pre-emphasis circuit. Thus, if the pre-emphasis circuit is used, $$K \alpha \sqrt{V'}$$

For reference, the input-output characteristics of the conventional asynchronous delta modulator is shown as follows:

$$K \alpha V$$

The input-output characteristics of the area delta modulator and the conventional asynchronous delta modulator are compared in a graph as shown in FIG. 3 as (a) and (b) respectively.

FIG. 3(a) in which the ordinate represents the number of pulses (N) sent-out during one cycle period and the abscissa stands for the amplitude of input signal (T), shows that the sent-out pulses are less in the area delta modulation than in the asynchronous delta modulation, when the minimum input amplitude that can be picked up is set at same level (that is: when, in the modulation with voice signal, the starting parts and/or endings of the words to be cut away are set at same level). Thus, the line $aa$ corresponds to the conventional asynchronous delta modulation and the line $ab$ the area delta modulation. FIG. 3(b) indicates that the minimum pickable input amplitude can be lowered by the area delta modulation, to lessen the cutting-away of starting parts and/or endings of the words, thus resulting in more improved articulation, when the average number of sent-out pulses is set to same rate in the modulation with voice signal. Namely, the line $ba$ corresponds to the conventional asynchronous delta modulation and the line $bb$ the area delta modulation, the ordinate and abscissa being same as in FIG. 3(a). These characteristics reflect the features of a distortionless compressor inherent to the area delta modulation.

Now, explanation will be given hereinafter about the situations by which the pulse intervals of the modulator output pulse are kept from being reduced to less than a certain length.

The minimum pulse interval of the modulator output pulse depends on the frequency and amplitude of the input signal. In the pulse modulation with voice signal in which there are generally very low probability of existence of extremely narrow pulse interval, it is possible for the transmission quality not to be much affected by making the pulse intervals a fixed uniform length whenever a pulse interval narrower than the above-mentioned fixed length will occur. However, if the lower limit for the pulse interval is set too narrowly the number of sent-out pulses cannot be increased in correspondence to the increase in the amplitude of larger inputs, tending to saturate as shown in FIG. 4. In actual operation, the modulator should be operated within a range of amplitude of the input signal in which said saturation occurs not often.

FIG. 4 shows the input-output characteristics of the area delta modulator compared with that of the asynchronous delta modulator, when the pulse intervals are limited, the input is a voice signal and the average number of sent-out pulses is made same. In FIG. 4 in which the ordinate and abscissa are the same as in FIG. 3, the line 4a corresponds to the conventional asynchronous delta modulation and the line 4b the area delta modulation. It will be noted that the saturation occurs in higher input level in the area delta modulator than in the conventional asynchronous delta modulator. FIG. 4 suggests that the pulse interval is generally larger in the area delta modulator and that the above-mentioned limitation on the pulse interval can be expanded in the area delta modulator, if same degree of saturation is allowed. That is, the minimum pulse interval can be larger in the area delta modulator.

The features of the area delta modulation will be hereinafter described from the results of test on the articulation.

FIG. 5 shows the results of the test made under the following conditions:

(1) A pre-emphasis circuit is provided at the input side of the modulator, its time constant being selected experimentally so as to give the highest articulation.

(2) A demodulation system is adopted in which the modulator output pulses, per se, are integrated.

(3) In the demodulation stage, a band-pass filter, is inserted whose pass band being selected so as to give the highest articulation.

(4) The minimum pulse interval is limited not to be less than 70 micro seconds. The pulse width is 10 micro seconds.

(5) The net number of sent-out pulses on the abscissa in FIG. 5, means the number of output pulses per second (send out from the modulator) averaged over the actual announcing period.

As seen from FIG. 5, the area delta modulation is superior in articulation to the asychronous delta system and present wider range of net number of output pulses with good articulation. That is, it offers a wider usable dynamic range. In FIG. 5, the line 5a corresponds to the area delta modulation and the line 5b the conventional asynchronous delta modulation.

Constitution of this invention will be hereinafter described relating to several examples of embodiment.

EXAMPLE 1

The embodiment of this invention shown in FIG. 6 will be explained with the aid of FIG. 7.

In FIG. 6, the reference numeral 1 designates input terminal, 2 is output terminal, 3 and 5 are gate clampers, 4 is integrator, 6 is memory circuit, 7 is comparator, 8 and 10 are positive and negative threshold detectors, and 9 and 11 are positive and negative pulse generators respectively.

(1) Assume that an output pulse $P_1$ appears at the output terminal 2. The pulse $P_1$ actuates the gate clamper 3 through the route 12 to clamp the output voltage from the integrator 4 (voltage on the route 13) at a level equal to the input signal voltage. Also, the pulse $P_1$ actuates the clamper 5 through the route 12 to clamp the output voltage from the memory circuit 6 (voltage on the route 14) at a level also equal to the input signal voltage.

(2) After vanishing of the output pulse $P_1$, output voltage from the integrator 4 rises with the rise of the input signal. Output voltage from the memory circuit 6 remains unchanged even after the passing-out of the output pulse $P_1$. Output voltage from the integrator 4 represents a sum of the input voltage at the time of appearance of the output pulse $P_1$ and the voltage resulted from integration of the increments of the input voltage during the ensuing period. Output voltage from the memory circuit 6 represents the input voltage at the time of appearance of the output pulse $P_1$. Difference between the output voltages of the integrator 4 and the memory circuit 6 compared through the comparator 7, represents the integrated sum of the increments of the input signal voltage after the appearance of the output pulse $P_1$, i.e., the area defined by the increment of the input voltage and the time axes.

(3) Output voltage from the comparator 7 is applied to the positive threshold detector 8 and the negative threshold detector 10. As in the example of FIG. 7, as the input signal voltage is increasing gradually, the output voltage from the comparator 7 reaches the positive threshold level to be detected with the threshold detector 8 and to be conveyed to the positive pulse generator, and thus the succeeding positive pulse $P_2$ is sent out to the terminal 2.

(4) The output pulse $P_2$ actuates the gate clampers 3 and 5 through the route 12, and the same operation as described above is repeated to produce the next pulse $P_3$ at the terminal 2. The modulation is realized by the repetition of these operations. It will be understood that negative output from the comparator 7 actuates the negative threshold detector 10, which in turn actuates the pulse generator 11 to produce a negative output pulse at the terminal 2. It will be obvious that, in actual design of the modulator, the circuit should be arranged so that the negative output pulse produced at the terminal 2 can be conveyed to the route 12 to actuate the clampers 3 and 5 in the same manner as with the positive output pulse.

EXAMPLE 2

In FIG. 8 which shows a block diagram of another embodiment of this invention, the reference numeral 1 is input terminal, 2 is output terminal, 15 and 17 are gate clampers, 16 is integrator, 18 and 20 are positive and negative threshold detectors, and 19 and 21 positive and negative pulse generators respectively.

(1) Output pulse $P_1$ that appears at the output terminal 2, is supplied to the gate clampers 15 and 17 as gate-pulse through the route 22. Receiving the output pulse $P_1$, the gate clamper 15 operates to clamp its output voltage at a fixed clamp level, regardless of the input signal voltage at the terminal 1. After vanishing of the output pulse $P_1$, the output voltage of the gate clamper 15 varies from A' to B' following to the change of the input voltage (from A to B). (See FIG. 9(b).)

The output voltage from the integrator 16 varies from A" to B", as shown in FIG. 9(c), as the result of integration of output voltage from the gate clamper 15. Output voltage from the gate clamper 17 which is operated by the output pulse $P_1$, is clamped to a fixed clamp level when the output pulse $P_1$ appears. However, it varies from A''' to B''' following to the output voltage of the integrator 16, after passing-out of the output pulse $P_1$. (See FIG. 9(d).)

(2) When the output voltage from the gate clamper 17 reaches the positive threshold level, the positive threshold detector operates to send out the next positive pulse $P_2$ to the output terminal 2 through the positive pulse generator 19.

(3) Upon appearance of the output pulse $P_2$ at the terminal 2, the gate clampers 15 and 17 operate for the second time to clamp the voltages on the route 23 and 25 to the fixed clamp level respectively, thus shifting the voltages from B' to C', and from B''' to C''' respectively, as shown in FIG. 9(b) and (d). After that, the similar operations are repeated to accomplish the modulation.

It will need no explanation that if the output voltage from the gate clamper 17 reaches the negative threshold level, the negative threshold detector 20 and consequently the negative pulse generator 21 operate to produce a negative output pulse at the output terminal 2.

Also, it will be obvious that the gate clampers 15 and 17 should be designed to operate satisfactorily, regardless of polarity of the output pulse.

EXAMPLE 3

An example of an alternative arrangement in which an additional function for limiting the interval of the output pulse is attached to the circuits of FIG. 8, is shown in FIG. 10, the operation of which will be explained hereinafter referring to FIG. 11.

In FIG. 10, it is seen that Schmitt circuits 26 and 28 are provided in places of the threshold detectors 18 and 20 in FIG. 8 respectively, and that inhibiting gates 27 and 29 are inserted respectively between 26 and the pulse generator 19, and between 28 and the pulse generator 21, these inhibiting gates being operated by gate pulses generated in the gate-pulse generator 30.

The gate-pulse generator is triggered by back edge of the output pulse which appears at the output terminal 2, to generate a gate-pulse of a fixed width $\tau g$. Now, the operation of the circuit will be explained with the aid of FIG. 11.

(1) Assuming that an output pulse $P_1$ appears at the terminal 2, this pulse $P_1$ actuates the gate clampers 15 and 17 (FIG. 10) to clamp the voltage on the route 31 from A to B as shown in FIG. 11(b), and the voltage on the route 32 from D to E as shown in FIG. 11(c). After passing out of the output pulse $P_1$, the voltage on the route 31 rises along the line BC following the rise of the input signal voltage. On the route 32 appears a voltage resulted from from integration of the voltage on the route 31, that is, a voltage representing the area composed by increment of the input signal voltage and the time axis, which rises along the line EG.

(2) On the other hand, the pulse generator 30, being triggered by trailing edge of the output pulse $P_1$, sends out a gate-pulse with a pulse width of $\tau g$. onto the route 34. While this gate-pulse exists, the inhibiting gate 27 or 29 prevents the pulse generator 19 or 21 from being triggered even when the Schmitt circuit 26 or 28 is switched on.

(3) The rising voltage on the route 32 reaches the positive threshold level at the point F in FIG. 11(c) to turn the Schmitt circuit 26 (FIG. 11(d)). At this instant, however, the inhibiting gate 27 is in the state of off because the period $\tau g$. has not yet elapsed after the output pulse $P_1$ passes out as stated above. Therefore, the pulse generator 19 is not triggered.

(4) Presently, the gate-pulse on the route 34 passes out to turn on the inhibiting gate 27. As the Schmitt circuit 26 is in the state of on at this instant, the pulse generator 19 is triggered to send out a positive output pulse $P_2$, at the instant as the gate 27 is switched on.

(5) Upon the appearance of the output pulse $P_2$, the voltage on the route 31 and 32 are clamped to the respective clamp level and the Schmitt circuit 26 is turned off.

(6) After passing-out of the output pulse $P_2$, the voltage on the route 32 rises for the second time, until it reaches the positive threshold level. At this instant, the gate 27 has already been turned on, as the period $\tau g$. has elapsed after the disapperance of the pulse $P_2$. Accordingly, the pulse generator 19 is triggered to produce the next output pulse $P_3$ at the output terminal 2, at the instant when the voltage on the route 32 reaches the positive threshold level.

The above-described arrangement enables the interval of the output pulses not to become shorter than $\tau g$., in the area delta modulation.

Though the pulse interval can be limited by the same manner also in the conventional asynchronous delta modulation, the minimum pulse interval can be prescribed at a greater value in the area delta modulation than in the asynchronous delta system, as described above, if the same articulation should be maintained. In other words, higher articulation is attained with the given minimum pulse interval.

EXAMPLE 4

An alternative arrangement of the area delta modulation system with which quantizing error and noise can be minimized, is shown in FIG. 12. Operation thereof will be described hereinafter with reference to FIG. 13.

In FIG. 12, the similar reference numerals indicate the corresponding circuits in FIG. 8, except that 35 is level-cross detector and 36 is gate-pulse generator.

(1) After the appearance of the output pulse $P_1$, the voltage on the route 37 varies along the line defined by ABCD following the variation of the input signal voltage. At the moment when the voltage crosses the zero level at the point C, 35 and 36 are actuated to produce the gate-pulse $P_g$ on the route 38.

(2) The gate-pulse $P_g$ actuates the gate clamper 17 to clamp the voltage on the route 39 to the fixed clamp level (FIG. 13(d)).

(3) After passing-out of the gate-pulse $P_g$, the voltage on the route 39 increases negative-ward as the result of the integration of the voltage on the route 37 (the voltage corresponding to CD in FIG. 13(b)).

(4) Presently, the voltage on the route 39, reaching the negative threshold level, actuates the negative threshold detector 20 and consequently the negative pulse generator 21 to send out a negative output pulse $P_2$ to the output terminal 2. This output pulse $P_2$, in turn, operates the gate clamper 15 and 17 to clamp the voltage on the routes 37 and 39 to the respective clamp level.

By this arrangement, the quantizing error can be minimized, as the offset between the positive area (ABC) and the negative area (CDE) is eliminated. If the positive and negative areas offset each other, appearance of the next pulse $P_2$ will be considerably delayed in cases where the area (ABC) is smaller than, but very near to, the quantizing unit area, thus making the quantizing error larger.

The gate clamper 17 operates when a pulse appears on either the route 22 or the route 38. As the level-cross detector 35 operates also at such points as A and E, besides the point C, pulse corresponding to the points A and E also appears on the route 38, besides the above-mentioned $P_g$. However, these pulses are useless and harmless, as they appear concurrently with those that appear on the route 22.

It will be understood that the arrangement described above can be adopted also in the system shown in FIG. 10.

EXAMPLE 5

Though the area delta modulation heretofore described is an asynchronous type pulse modulation, it is possible to realize a synchronous type area delta modulation, by using clock-pulses.

The synchronous type pulse modulation, when used in the asynchronous multiplex system, is generally effective for elimination of noise as synchronous receiving can be applicable.

An example of the synchronous type area delta modulation arrangement is shown in FIG. 14.

In the arrangement of FIG. 14, the Schmitt circuits 26 and 28 are used in places of the threshold detectors 18 and 19 in FIG. 8. Between these circuits and the pulse generators 19 and 21 are inserted the AND gates 40 and 41 respectively, output pulse from the clock-pulse generator 42 being used as the gate-pulse for the gates 40 and 41.

While output from the gate-clamper 17 is higher than the positive or negative threshold level, the Schmitt circuit 26 or 28 is in the state of on. If a clock pulse occurs during this period, the positive or negative pulse generator is actuated to produce respectively positive or negative pulse at the output terminal 2.

Waveforms of the voltages at the various points of FIG. 14 are shown in FIG. 15.

It will need not to say that a synchronous type area delta modulator can be obtained by applying the above-mentioned method to the system shown in FIG. 6.

In the arrangements described in Examples 1 to 5, the pulse on the route 12 in FIG. 6 or on the route 22 in FIGS. 8, 10, 12 and 14, is not required to be of closely defined height as it is used as a gate pulse. This fact allows easier design of the circuits.

EXAMPLE 6

Another modification of the area delta modulation is shown in FIG. 16. In the arrangement of FIG. 16, comparator 48 and local decoder 49 are placed, as in the ordinary delta modulation, in place of the gate clamper in FIG. 8. However, it differs from the ordinary delta modulation in the fact that the gate clamper 17 is connected to the output of the integrator 16, to be gate-clamped (reset) by the output pulse.

Operation of the circuit is similar to that of FIG. 8, excepting the comparator 48 and the local decoder 49.

Waveforms of the voltages at various points of FIG. 16 are shown in FIG. 17. Output pulse at the output terminal 2 is applied to the local decoder 49 to rise the voltage on the route 50 in stepping manner. The voltage on the route 50 and the input signal voltage are compared with the comparator 48 and the differences are integrated. As the integrator is reset whenever an output pulse appears, output voltage of the comparator 48 starts to be integrated after the occurrence of the output pulse. Referring to FIG. 17(a), though an output pulse $P_1$ is produced when the area (ABC) reaches the threshold level, the voltage on the route 50 due to $P_1$ rises only up to the point D. Accordingly, the next pulse $P_2$ is sent out when the area (BDFE) reaches the threshold level.

It will be most satisfactory if the voltage on the route 50 is varied stepping-wise, whenever an output pulse occurs, by an amount inversely proportional to the time interval between the output pulse and the preceding output pulse. However, it is permissible to vary the voltage on the route 50 by a certain fixed amount instead of the inversely proportional one, for easier production and lower cost; though, in the latter case, a tendency is seen that the number of output pulse is considerably large and/or the pulse intervals are significantly shorter as compared with the circuits of FIG. 8.

In the various systems described heretofore, the output from gate clamper 15 and the output from comparator 48, both combined, may be referred to as difference voltage. The essential feature of various arrangements based on the fundamental conception of this invention is to determine whether the integrated amount of the difference voltages after the occurrence of an output pulse reaches the threshold level or not. In other words, it is to use the gate clamper which is connected to the output of the integrator that integrates the difference voltages, and which operates with the output pulse of the modulator. By this function, features of the area delta modulation characterized by less pulse number and higher articulation, are realized.

What is claimed is:

1. Area delta modulation system for generating a train of pulses representative of an input signal applied to the system, comprising: an integrator for receiving and integrating an input signal to the system; a first gated clamper connected in parallel with said integrator for adjusting the output of the latter to the instantaneous level of said input signal at the moment when a gate pulse is fed to said first gated clamper; a second gated clamper to which a portion of said input signal is supplied, said gate pulse being also fed to said second gated clamper; a memory circuit for storing the level of said input signal at the time when said gate pulse is fed to said gated clampers; a comparator to which the outputs of said integrator and said memory circuit are supplied as a first and a second input so that the difference of the inputs is produced; threshold detecting means connected with said comparator to receive said differential output from said comparator and to generate, when said differential output exceeds either one of predetermined positive and negative levels, an output of the corresponding polarity; pulse generating means connected with said threshold detecting means for generating an output pulse of the corresponding polarity in response to said output of said threshold detecting means; a circuit means for conducting said output of said pulse generating means to an output terminal; and circuit means for connecting said output terminal and said first and second gated clampers to feed a portion of the output of said pulse generating means as said gate pulses to said clampers.

2. Area delta modulation system for generating a train of pulses representative of an input signal applied to the system, comprising: input means including a first gated clamper for receiving an input signal to the system; integrating means connected with said first gated clamper for integrating said input signal fed thereto through said first gated clamper; a second gated clamper connected with said integrating means; said first and second gated clampers being coupled through conductor means to the output of the system for clamping said input signal and the output of said integrating means to individual, predetermined levels, respectively, at the time whenever an output pulse is delivered from the system and for causing said input signal and the output of said integrating means to start from their clamped levels during the time when any output pulse is not delivered from the system; threshold detecting means connected with said integrating means for producing an output of either one of positive and negative polarities when detecting the exceeding of predetermined either one of positive and negative levels by the output of said integrating means; and means connected with said threshold detecting means for generating a pulse as an output of the system in response to said detection by said threshold detector.

3. Area delta modulation system as set forth in claim 2, in which inhibit circuit means is connected between said threshold detecting means and said pulse generating means, said inhibit gate circuit means being arranged to be triggered by a gate pulse generator serving to make active said inhibit gate circuit means for a predetermined period of time in response to each output pulse generated from said pulse generating means thereby to inhibit the passage of the output of said threshold detecting means to said pulse generating means for said period of time.

4. Area delta modulation system as set forth in claim 2, in which means is provided to detect zero-level crossing of the output of said first gated clamper and further a gate pulse generator is provided to produce a gate pulse each time the zero-level crossing by the output of said first clamper is detected, said zero-level crossing detecting means being connected between said first gated clamper and said gate pulse generator, which generator is in turn connected with said second gated clamper to effect a clamping of the output of said integrating means to said predetermined level.

5. Area delta modulation system as set forth in claim 2, further comprising AND gate circuit means connected between said threshold detecting means and said pulse generating means, and a clock pulse generator connected with said AND gate circuit means so that the system sends out an output pulse only when said AND gate circuit means receives outputs from both of said detecting means and said clock pulse generator.

References Cited

UNITED STATES PATENTS

| | | | |
|---|---|---|---|
| 2,662,113 | 12/1953 | Schouten et al. | 332—11X |
| 2,745,063 | 5/1956 | De Jager | 332—11 |
| 3,273,141 | 9/1966 | Hackett | 340—347 |
| 3,292,178 | 12/1966 | Magnuski | 179—15X |
| 3,402,352 | 9/1968 | Lerner | 325—38 |
| 3,462,686 | 8/1969 | Shutterly | 325—38 |

RICHARD MURRAY, Primary Examiner

B. V. SAFOUREK, Assistant Examiner

U.S. Cl. X.R.

179—15AP, 15BA; 325—55, 142; 332—11